(12) United States Patent
Liu et al.

(10) Patent No.: US 11,036,733 B2
(45) Date of Patent: Jun. 15, 2021

(54) METHOD, APPARATUS, SYSTEM, SERVER, AND STORAGE MEDIUM FOR CONNECTING TABLES STORED AT DISTRIBUTED DATABASE

(71) Applicant: Ant Financial (Hang Zhou) Network Technology Co., Ltd., Hangzhou (CN)

(72) Inventors: Bin Liu, Hangzhou (CN); Yi Pan, Hangzhou (CN); Bo Zhang, Hangzhou (CN); Huang Yu, Hangzhou (CN)

(73) Assignee: Ant Financial (Hang Zhou) Network Technology Co., Ltd., Hangzhou (CN)

(*) Notice: Subject to any disclaimer, the term of this patent is extended or adjusted under 35 U.S.C. 154(b) by 0 days.

(21) Appl. No.: 16/882,880

(22) Filed: May 26, 2020

(65) Prior Publication Data

US 2020/0285641 A1 Sep. 10, 2020

Related U.S. Application Data

(63) Continuation of application No. PCT/CN2020/072120, filed on Jan. 15, 2020.

(30) Foreign Application Priority Data

Aug. 20, 2019 (CN) .......................... 201910769332.9

(51) Int. Cl.
 *G06F 16/2453* (2019.01)
 *G06F 16/22* (2019.01)
 (Continued)

(52) U.S. Cl.
 CPC .... *G06F 16/24537* (2019.01); *G06F 16/2282* (2019.01); *G06F 16/2456* (2019.01); *G06F 16/27* (2019.01)

(58) Field of Classification Search
 CPC .............. G06F 16/24537; G06F 16/27; G06F 16/2456; G06F 16/2282
 (Continued)

(56) References Cited

U.S. PATENT DOCUMENTS

| | | |
|---|---|---|
| 2005/0097103 A1 | 5/2005 | Zane et al. |
| 2013/0185731 A1 | 7/2013 | Barsness et al. |

(Continued)

FOREIGN PATENT DOCUMENTS

| | | |
|---|---|---|
| CN | 104391957 A | 3/2015 |
| CN | 107870954 A | 4/2018 |
| CN | 109299340 A | 2/2019 |

OTHER PUBLICATIONS

First Office Action for Chinese Application No. 201910769332.9, dated Apr. 17, 2020, 6 pages.

(Continued)

*Primary Examiner* — Kuen S Lu

(57) ABSTRACT

A method includes: obtaining, by an inner table node that stores a portion of an inner table, a portion of an outer table from each of outer table nodes, and wherein a size of the outer table is less than a size of the inner table; reading, by the inner table node, the outer table by table joining threads or table joining processes of the inner table node; matching, by the table joining threads or the table joining processes, the outer table with the portion of the inner table stored at the inner table node; and outputting, by the inner table node, data from the outer table and the portion of the inner table that matches with each other.

17 Claims, 4 Drawing Sheets

(51) Int. Cl.
*G06F 16/2455* (2019.01)
*G06F 16/27* (2019.01)

(58) Field of Classification Search
USPC .......................................................... 707/714
See application file for complete search history.

(56) References Cited

U.S. PATENT DOCUMENTS

| | | |
|---|---|---|
| 2013/0232133 A1 | 9/2013 | Al-Omari et al. |
| 2014/0081950 A1 | 3/2014 | Rajan et al. |
| 2014/0214794 A1* | 7/2014 | Attaluri ................ G06F 16/278 707/714 |
| 2014/0250142 A1* | 9/2014 | Pradhan .............. G06F 16/2453 707/765 |
| 2014/0372392 A1 | 12/2014 | Attaluri et al. |
| 2015/0261818 A1* | 9/2015 | Attaluri ............... G06F 16/2456 707/714 |
| 2016/0034531 A1 | 2/2016 | Barber et al. |
| 2016/0147859 A1 | 5/2016 | Lee et al. |
| 2016/0267135 A1 | 9/2016 | Idicula et al. |
| 2016/0328462 A1 | 11/2016 | Dinker et al. |
| 2018/0025052 A1 | 1/2018 | Nambiar et al. |
| 2018/0129708 A1 | 5/2018 | Beavin et al. |
| 2018/0165331 A1 | 6/2018 | Zhang et al. |
| 2018/0205672 A1* | 7/2018 | Dong .................... G06F 16/254 |

OTHER PUBLICATIONS

Second Office Action for Chinese Application No. 201910769332.9, dated Jul. 10, 2020, 6 pages.

Master's Dissertation, Distributed Joins and Optimization for Big Table Based on Database Oceanbase, East China Normal University, Computer Science and Software Engineering Institute, Apr. 5, 2016, 86 pages, English Abstract.

Supplementary Search for Chinese Application No. 201910769332.9 dated Apr. 7, 2021.

* cited by examiner

METHOD, APPARATUS, SYSTEM, SERVER, AND STORAGE MEDIUM FOR CONNECTING TABLES STORED AT DISTRIBUTED DATABASE

CROSS REFERENCE TO RELATED APPLICATIONS

This application is a continuation application of International Application No. PCT/CN2020/072120, filed on Jan. 15, 2020, which claims priority to and benefits of Chinese Patent Application No. 201910769332.9 filed on Aug. 20, 2019. The contents of the above-referenced applications are incorporated herein by reference in their entirety.

TECHNICAL FIELD

Embodiments of the specification relate to the technical field of data storage, and in particular, to a method and device for jointing tables in a distributed database, a system, a server, and a readable storage medium.

BACKGROUND

Algorithms for joining database tables play a very important role in database engines. Since a table in a database records a limited amount of information, it is often required to create various types of tables to store information. When one search request involves a plurality of tables stored at distributed databases, certain joining conditions are required to join these tables to provide information desired by a user. At this point, database table joining technologies are used.

SUMMARY

Embodiments of the specification provide a distributed database table joining method and device, a system, a server, and a readable storage medium.

According to a first aspect, the embodiments of the specification provide a method for joining tables in a distributed database. The method comprises: sending outer table data to each inner table node by broadcasting a message; reading, by a table joining thread or process of the inner table node, outer table data according to a preset data read policy; and matching, by the table joining thread or process, the read outer table data with inner table data of the node where the outer table data is located, and outputting data that meets a joining condition.

According to a second aspect, the embodiments of the specification provide a device for joining tables in a distributed database, wherein the device is arranged at each inner table node, and the device comprises: a broadcast receiving unit configured to receive outer table data by broadcasting a message; and at least one table joining thread or process configured to read outer table data according to a preset data read policy; and match the read outer table data with inner table data of the node where the outer table data is located, and output data that meets a joining condition.

According to a third aspect, the embodiments of the specification provide a device for joining tables in a distributed database, wherein the device is arranged at an outer table node, and the device comprises: a broadcast sending unit configured to send outer table data to each inner table node by broadcasting a message.

According to a fourth aspect, the embodiments of the specification provide a distributed database system, comprising at least one outer table node and a plurality of inner table nodes, wherein the outer table node is configured to send outer table data to each inner table node by broadcasting a message; and the inner table nodes are configured to receive the outer table data by broadcasting a message; use a table joining thread or process to read outer table data according to a preset data read policy, and match the read outer table data with inner table data of the node where the outer table data is located, and output data that meets a joining condition.

According to a fifth aspect, the embodiments of the specification provide a server, comprising a memory, a processor, and a computer program stored in the memory and executable by the processor, wherein the processor implements, when executing the program, steps of any of the above-described methods.

According to a sixth aspect, the embodiments of the specification provide a computer readable storage medium storing a computer program, wherein the program implements, when executed by a processor, steps of any of the above-described methods.

According to a seventh aspect, the embodiments of the specification provide a method for joining tables in a distributed database. The method includes: obtaining, by an inner table node that stores a portion of an inner table, a portion of an outer table from each of outer table nodes, and wherein a size of the outer table is less than a size of the inner table; reading, by the inner table node, the portions of the outer table by table joining threads or table joining processes of the inner table node; matching, by the table joining threads or the table joining processes, the portions of the outer table with the portion of the inner table stored at the inner table node; and outputting, by the inner table node, data from the portions of the outer table and the portion of the inner table that matches with each other.

In some embodiments, the portions of the outer table stored at the outer table nodes constitute the entire outer table. The reading, by the inner table node, the portions of the outer table by table joining threads or table joining processes of the inner table node includes: dividing the outer table into a plurality of pieces of data in a random or Round-Robin manner; and reading, by each of the table joining threads or the table joining processes, each of the plurality of pieces of data in sequence.

In some embodiments, the reading, by the inner table node, the portions of the outer table by table joining threads or table joining processes of the inner table node includes: gathering all portions of the outer table in a data set, each portion sent by an outer table node; and reading, by each of the table joining threads or the table joining processes, data row by row or in batches from the data set until the data set is completely read.

In some embodiments, the portion of the inner table stored at the inner table node includes a primary key index or a local index. The matching, by the table joining thread or the table joining process, the portions of the outer table with the portion of the inner table stored at the inner table node includes: searching, according to the primary key index or the local index in the table joining threads or the table joining processes, data of the inner table to match with data of the outer table.

According to an eighth aspect, the embodiments of the specification provide an apparatus. The apparatus includes one or more processors; and a memory storing instructions executable by the one or more processors to cause the one or more processors to perform operations including: obtaining, by an inner table node that stores a portion of an inner table, a portion of an outer table from each of outer table nodes, and wherein a size of the outer table is less than a size of the inner table; reading, by the inner table node, the portions of the outer table by table joining threads or table joining processes of the inner table node; matching, by the table joining threads or the table joining processes, the portions of the outer table with the portion of the inner table stored at the inner table node; and outputting, by the inner table node, data from the portions of the outer table and the portion of the inner table that matches with each other.

According to a ninth aspect, the embodiments of the specification provide one or more non-transitory computer-readable storage media configured with instructions executable by one or more processors to cause the one or more processors to perform operations including: obtaining, by an inner table node that stores a portion of an inner table, a portion of an outer table from each of outer table nodes, and wherein a size of the outer table is less than a size of the inner table; reading, by the inner table node, the portions of the outer table by table joining threads or table joining processes of the inner table node; matching, by the table joining threads or the table joining processes, the portions of the outer table with the portion of the inner table stored at the inner table node; and outputting, by the inner table node, data from the portions of the outer table and the portion of the inner table that matches with each other.

The embodiments of the specification achieve the following advantageous effects:

The embodiments of the specification provide a method for joining tables in a distributed database, which prevents inner table nodes from globally accessing relatively large inner table data by broadcasting a relatively small outer table to the inner table nodes, and thus lowers the execution overhead.

DETAILED DESCRIPTION OF EMBODIMENTS

To better understand the above-described technical solutions, the technical solutions of the embodiments of the specification will be described in detail below with reference to the accompanying drawings and exemplary embodiments. It should be understood that the embodiments of the specification and exemplary features of the embodiments are to describe the technical solutions of the embodiments of the specification in detail, instead of limiting the technical solutions of the embodiments of the specification. In the case of no conflict, the embodiments of the specification and technical features of the embodiments may be combined with each other.

Nested Loop Join (NLJ) is a table joining technology. Assuming that two tables need to be joined, these two tables may be referred to as an outer table and an inner table (or referred to as a left table and a right table), respectively. NLJ is implemented to joint each row of the outer table with the inner table. If a joining condition is matched, a result is output. In addition to NLJ, algorithms such as Block Nested Loop (BNL) may also realize table joining. For the purpose of concise description, NLJ is taken as an example for description in some embodiments of the specification. However, it should be understood that other table joining technologies may also be used.

In a distributed database system, the implementation of distributed table joining may be complicated. For example, it is required by the NLJ principle that a thread/process for executing table joining is capable of accessing all data in the right table. However, in a distributed database system, data in the right table is stored in pieces on multiple nodes (machines), and it is costly to access all data in the right table at a single node.

On the other hand, the embodiments of the specification provide a distributed database table jointing method, which prevents global access to relatively large inner tables by broadcasting a relatively small outer table to each node of an inner table. Otherwise, to perform NLJ, each row of the outer table must be used to globally match the inner table on each inner table node, and the total number of Remote Procedure Call (RPC) is "the number of rows in the outer table*the number of inner table nodes," while the total number of RPC in the embodiments of the specification is "the number of nodes in the right table."

Figure 1:
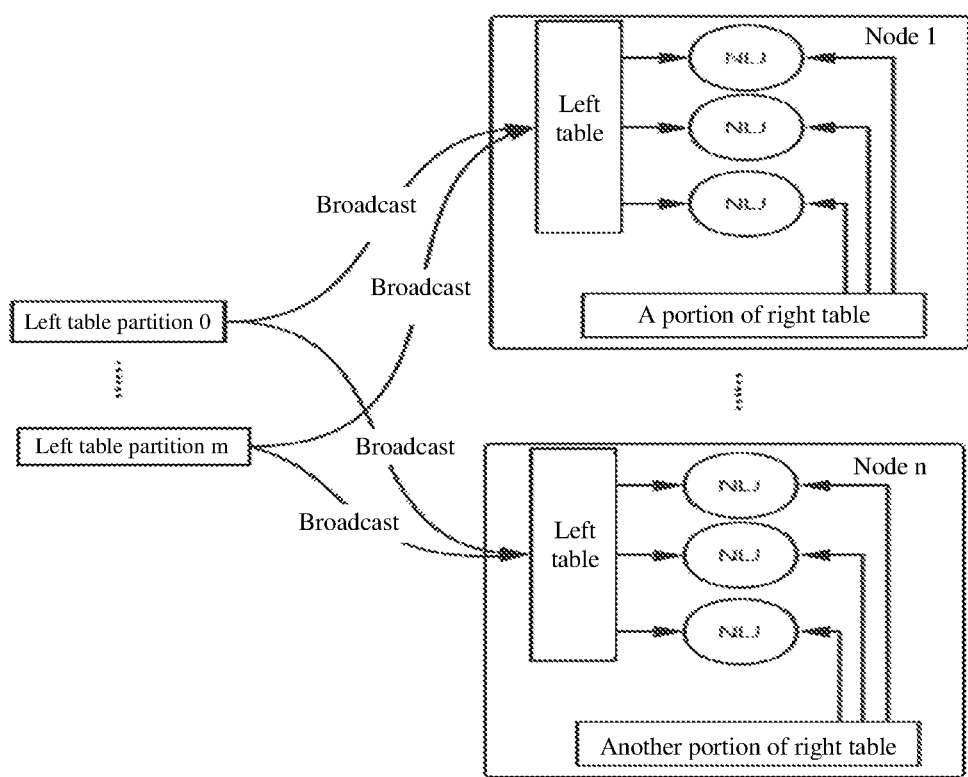
FIG. 1 is a schematic diagram of an exemplary application scenario of a method for joining tables in a distributed database according to some embodiments of the specification.

FIG. 1 is a schematic diagram of an exemplary application scenario of the method for joining tables in a distributed database according to some embodiments of the specification. In FIG. 1, the left table is the outer table, and the right table is the inner table. It is shown in the figure that data in the left table comprises a left table data partition 0 . . . and a left table data partition m. All the data in the left table is sent to each right table node by broadcasting a message. Namely, all the right table nodes (node 1, . . . , and node n) obtain a copy of all the data in the left table. A plurality of NLJ units (which are modules configured to execute NLJ, e.g., NLJ threads or processes) are shown in each right table node. Each NLJ reads the data in the left table and matches the data in the left table with data of the same machine in the right table, thereby outputting a result of data meeting a table joining condition.

Figure 2:
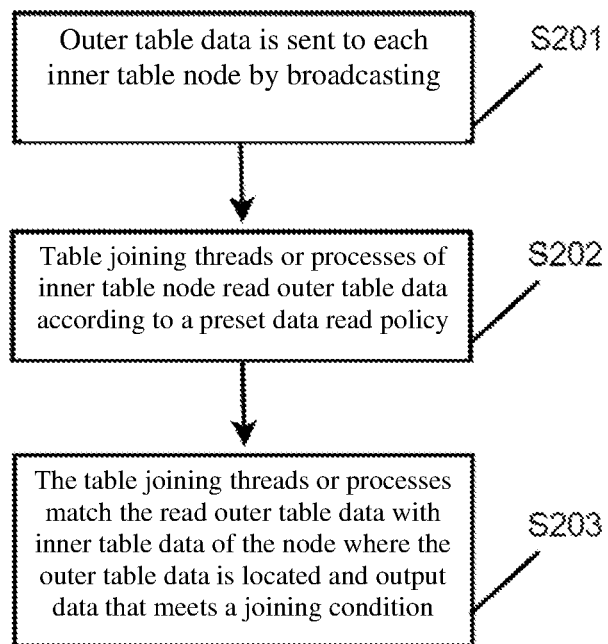
FIG. 2 is a flow chart of a method for joining tables in a distributed database according to some embodiments of the specification.

According to a first aspect, the embodiments of the specification provide a method for joining tables in a distributed database. FIG. 2 is a flow chart of the distributed database method. The method comprises Steps S201-S203.

In S201, outer table data is sent to each inner table node by broadcasting a message.

NLJ is now taken as an example. According to NLJ, the outer table may have a small amount of data, while the data amount in the inner table is much larger than that of the outer table. The data in the outer table may be stored in pieces on one or more outer table nodes or not stored in pieces on one outer table node, which is not limited in the embodiments of the specification. The inner table data may be stored in pieces on one or more nodes. As shown in FIG. 1, a portion of the inner table data is stored respectively in the node 1 to the node n.

There have always been broadcasting methods in distributed database systems. Generally, a broadcasting target is a process/thread. When there are n threads/processes on nodes, n data copies are to be broadcast. However, in the embodiments of the specification, the broadcasting target is a computation node, and the number of data copies to be broadcast is only related to the number of computation nodes corresponding to the right table, but not related to the number of threads/processes in a computation node.

Therefore, to broadcast the outer table data to each inner table node, a number of inner table nodes may be determined first, and then the outer table data may be copied in a number equal to the number of inner table nodes. Subsequently, each copy of the outer table data is sent to each inner table node by broadcasting a message. Correspondingly, all the data in the outer table is ultimately received at each inner table node. In other words, a copy of all the data in the outer table may be formed at each inner table node.

In S202, table joining threads or processes of the inner table node read outer table data according to a preset data read policy.

NLJ is now taken as an example again. A unit configured to execute NLJ may typically be a thread or process. Therefore, it should be understood that a table joining thread or process refers to a functional unit configured to execute table joining. In an inner table node, the NLJ thread or process reads data from a copy of the outer table data, then matches the read data with the inner table data in the current node, finds a row that meets a joining condition, and outputs the row.

There may be a plurality of implementations of reading outer table data by an NLJ thread or process. Two implementations will be enumerated below.

For example, the outer table data is first divided into a plurality of pieces of data in a random or Round-Robin manner; and then, each table joining thread or process reads each piece of the data in sequence. For example, the outer table data obtained through broadcasting is divided into m pieces in advance according to a policy (such as random and Round-Robin), and each NLJ thread or process reads one piece of the data. In this way, each NLJ thread or process is responsible for processing a portion of the outer table data.

For another example, a unified data set is first formed using the outer table data that is broadcast to inner table nodes; and then, each table joining thread or process of the inner table nodes reads data row by row or in batches from the data set until the data set is completely read. For example, the outer table data obtained through broadcasting is not required to be divided in advance, and after being broadcast to each inner table node, table a unified data set S at the inner table node. The m NLJ threads or processes at the inner table node seize data row by row/in batches from the data set S, and after completing a matching operation on this portion of data, continue to seize the next row/batch until the data in the set S is completely consumed.

In S203, the table joining thread or process matches the read outer table data with inner table data of the node where the outer table data is located and then outputs data that meets a joining condition.

Each inner table node stores a portion of inner table data. This portion of the data includes a primary key index or a local index to achieve efficient NLJ operations. When inner table data of an inner table node includes a primary key index or a local index, the table joining thread or process searches for inner table data according to the primary key index or the local index of the inner table data and matches the read outer table data with the obtained inner table data. The primary key index or the local index is not required.

NLJ is now taken as an example. Its process of realizing table joining is as follows: scanning the outer table (also referred to as a drive form); and whenever a record is read, searching the other table (the inner table) according to an index in a join field. The inner table (which is usually a table including the index) is driven by the outer table, and a row matching each row returned from the outer table needs to be searched in the inner table. If there are three or more tables, the NLJ algorithm is first used to obtain a result set of one or two tables, this result set is used as data of an outer layer, and data in the third table is searched after this result set is traversed. One simple NLJ algorithm is used to sequentially read rows one by one from the first table in a cyclic manner, and to match each obtained row in the next connected table in a cyclic manner. This process is repeated for multiple times until all the remaining tables are connected.

Therefore, the method for joining tables in a distributed database provided by the embodiments of the specification prevents inner table nodes from globally accessing relatively large inner tables by broadcasting a relatively small outer table to the inner table nodes, thus lowering the execution overhead.

For example, first, all the data in the outer table is broadcast to all inner table nodes required to execute a table joining operation, such that each inner table node comprises all the data in the outer table. Moreover, the total data amount to be broadcast is only proportional to the number of inner table node machines, but not related to the number of operating threads/processes, which saves network bandwidth;

Second, the outer table data is divided according to a very flexible policy (such as random, Round-Robin, and Batch) at each inner table node and is then distributed to threads/processes that execute the table joining, which can achieve a good effect of balanced loads; and Third, at each inner table node, it is just required to access data in the right table at the current node, and a correct result can be obtained by performing a Join operation on the data in the right table at the current node and all the received data in the outer table without accessing all the data in the inner tables, which avoids the overhead of inter-machine accessing the inner tables and also avoids bottom-level support structures, such as Cache Fusion. Generally speaking, the data amount in the inner table is much higher than that of the outer table. If every inner table node needs to access all the data in the outer table, the cost will be extremely high.

Figure 3:
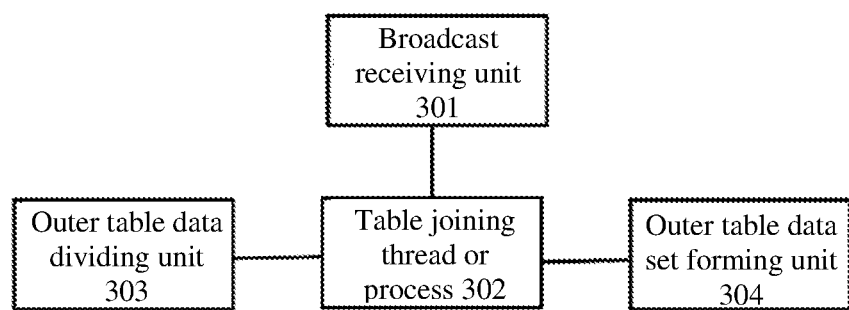
FIG. 3 is a block diagram of a device for joining tables in a distributed database according to some embodiments of the specification.

According to a second aspect, based on a similar concept, the embodiments of the specification provide a device for joining tables in a distributed database, wherein the device is arranged at each inner table node, and referring to FIG. 3, the device includes: a broadcast receiving unit 301 and at least one table joining thread or process 302.

The broadcast receiving unit 301 is configured to receive outer table data by broadcasting a message.

The at least one table joining thread or process 302 is configured to read outer table data according to a preset data read policy; and match the read outer table data with inner table data of the node where the outer table data is located and output data that meets a joining condition.

In some embodiments, the device further includes an outer table data dividing unit 303 configured to divide the outer table data into a plurality of pieces of data in a random or Round-Robin manner. The table joining thread or process 302 is specifically configured to read each piece of the data in sequence.

In some embodiments, the device further includes an outer table data set forming unit 304 configured to table a unified data set using the outer table data that is broadcast to inner table nodes. The table joining thread or process 302 is configured, for example, to read data row by row or in batches from the data set until the data set is completely read.

In some embodiments, the inner table data of the inner table node includes a primary key index or a local index; wherein the table joining thread or process 302 is specifically configured to search for inner table data according to the primary key index or the local index of the inner table data and match the read outer table data with the obtained inner table data.

Figure 4:
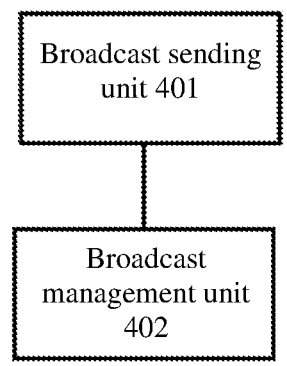
FIG. 4 is a block diagram of another device for joining tables in a distributed database according to some embodiments of the specification.

According to a third aspect, based on a similar concept, the embodiments of the specification provide a device for joining tables in a distributed database, wherein the device is arranged at an outer table node. Referring to FIG. 4, the device includes a broadcast sending unit 401 configured to send outer table data to each inner table node by broadcasting a message.

In some embodiments, the device further includes a broadcast management unit 402 configured to determine a number of inner table nodes, and make copies of the outer table data in a number equal to the number of inner table nodes, thereby causing the broadcast sending unit 401 to send each copy of the outer table data to each inner table node by broadcasting a message.

According to a fourth aspect, based on a similar concept, the embodiments of the specification provide a distributed database system.

Generally speaking, a distributed database system (DDBS) comprises a distributed database management system (DDBMS) and a distributed database (DDB). In a distributed database system, one application may perform transparent operations on the database. Data in a database is respectively stored in different local databases, is managed by different DBMS, runs on different machines, is supported by different operating systems, and is connected together by different communication networks.

The distributed database system according to some embodiments of the specification further comprises at least one outer table node and a plurality of inner table nodes. The outer table node is configured to send outer table data to each inner table node by broadcasting a message. The inner table nodes are configured to receive the outer table data by broadcasting a message, and use a table joining thread or process to read outer table data according to a preset data read policy, and then match the read outer table data with inner table data of the node where the outer table data is located and output data that meets a joining condition.

Figure 5:
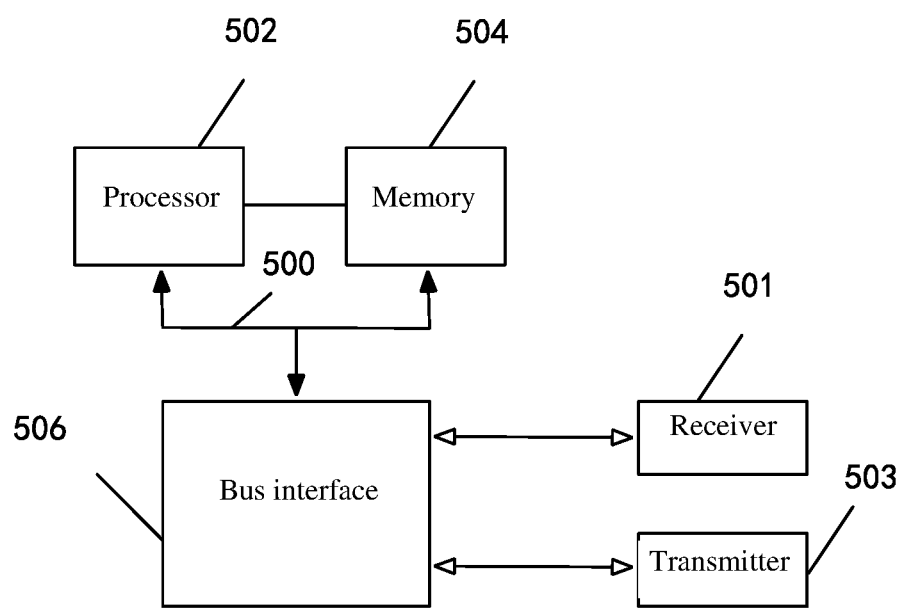
FIG. 5 is a block diagram of a server according to some embodiments of the specification.

According to a fifth aspect, based on a similar concept as the method for joining tables in a distributed database in the above embodiments, the specification further provides a server, which, as shown in FIG. 5, comprises a memory 504, a processor 502, and a computer program stored in the memory 504 and executable by the processor 502. The processor 502 implements, when executing the program, steps of any one of the above-described methods for joining tables in a distributed database.

In FIG. 5, there is a bus architecture (which is represented by a bus 500). The bus 500 may comprise any number of interconnected buses and bridges. The bus 500 may link together various circuits comprising one or more processors represented by the processor 502 and memories represented by the memory 504. The bus 500 may further link together various other circuits, such as peripheral devices, voltage stabilizers, power management circuits, and the like. All these are known in the art, which will not be further elaborated herein. A bus interface 506 provides a port between the bus 500 and a receiver 501 and a transmitter 503. The receiver 501 and the transmitter 503 may be the same element, i.e., a transceiver that provides a unit configured to communicate with various other devices on a transmission medium. The processor 502 is responsible for managing the bus 500 and regular processing, while the memory 504 may be configured to store data used by the processor 502 when executing operations.

According to a sixth aspect, based on a similar concept as the method for joining tables in a distributed database in the above embodiments, the specification further provides a computer readable storage medium storing a computer program, wherein the program implements, when executed by a processor, steps of any one of the above-described method for joining tables in a distributed database.

The specification is described with reference to flowcharts and/or block diagrams of the method, device (system), and computer program product according to the embodiments of the specification. It should be understood that a computer program instruction may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of other programmable data processing devices to generate a node, causing the instructions executed by a computer or a processor of other programmable data processing devices to generate an apparatus for implementing a function specified in one or more processes in the flowcharts and/or in one or more blocks in the block diagrams.

These computer program instructions may also be stored in a computer readable memory that can instruct a computer or other programmable data processing devices to work in a particular manner, causing the instructions stored in the computer readable memory to generate a manufactured article that includes an instruction apparatus. The instruction apparatus implements a function specified in one or more processes in the flowcharts and/or in one or more blocks in the block diagrams.

These computer program instructions may also be loaded onto a computer or other programmable data processing devices, causing a series of operational steps to be performed on the computer or other programmable devices, thereby generating computer-implemented processing. Therefore, the instructions executed on the computer or other programmable devices provide steps for implementing a function described in one or more processes in the flowcharts and/or in one or more blocks in the block diagrams.

Although preferred embodiments of the specification have been described, these embodiments may be amended or modified in other ways once one of ordinary skill in the art learns the basic innovative concepts. Therefore, the appended claims are intended to be interpreted as encompassing the preferred embodiments and all amendments and modifications that fall within the scope of the specification.

Apparently, one of ordinary skill in the art may make various modifications and variations to the specification without departing from the spirit and scope of the specification. In this way, if these modifications and variations to the specification fall within the scope of the claims of the specification and equivalent technologies thereof, then the specification also intends to encompass these modifications and variations.

What is claimed is:

1. A method for joining tables in a distributed database, comprising:
   obtaining, by an inner table node that stores a portion of an inner table less than the entire inner table, an entire outer table by obtaining a portion of the outer table from each of outer table nodes through a computer network that couples the inner table node to each of the outer table nodes, wherein a size of the entire outer table is less than a size of the entire inner table, and the portion of the inner table is not transmitted from the inner table node to the outer table nodes;
   reading, by the inner table node, the entire outer table by table joining threads or table joining processes of the inner table node;
   matching, by the table joining threads or the table joining processes, the outer table with the portion of the inner table stored at the inner table node; and
   outputting, by the inner table node, data from the outer table and the portion of the inner table that matches with each other.

2. The method according to claim 1, wherein the reading, by the inner table node, the entire outer table by table joining threads or table joining processes of the inner table node comprises:
   dividing the outer table into a plurality of pieces of data in a random or Round-Robin manner; and
   reading, by each of the table joining threads or the table joining processes, each of the plurality of pieces of data in sequence.

3. The method according to claim 1, wherein the reading, by the inner table node, the entire outer table by table joining threads or table joining processes of the inner table node comprises:
   gathering all portions of the outer table in a data set, each portion sent by an outer table node; and
   reading, by each of the table joining threads or the table joining processes, data row by row or in batches from the data set until the data set is completely read.

4. The method according to claim 1, wherein the portion of the inner table stored at the inner table node includes a primary key index or a local index; and
   the matching, by the table joining thread or the table joining process, the outer table with the portion of the inner table stored at the inner table node comprises:
   searching, according to the primary key index or the local index in the table joining threads or the table joining processes, data of the inner table to match with data of the outer table.

5. The method according to claim 1, wherein the table joining threads include a Nested Loop Join algorithm.

6. The method according to claim 1, wherein the portion of the outer table is sent to the inner table node by broadcasting.

7. An inner table node, comprising:
   one or more processors; and
   a memory storing a portion of an inner table less than the entire inner table and instructions executable by the one or more processors to cause the one or more processors to perform operations comprising:
   obtaining an entire outer table by obtaining a portion of the outer table from each of outer table nodes through a computer network that couples the inner table node to each of the outer table node, wherein a size of the entire outer table is less than a size of the entire inner table, and the portion of the inner table is not transmitted from the inner table node to the outer table nodes;
   reading the entire outer table by table joining threads or table joining processes of the inner table node;
   matching, by the table joining threads or the table joining processes, the outer table with the portion of the inner table stored at the inner table node; and
   outputting data from the outer table and the portion of the inner table that matches with each other.

8. The inner table node according to claim 7, wherein the reading the entire outer table by table joining threads or table joining processes of the inner table node comprises:
   dividing the outer table into a plurality of pieces of data in a random or Round-Robin manner; and
   reading, by each of the table joining threads or the table joining processes, each of the plurality of pieces of data in sequence.

9. The inner table node according to claim 7, wherein the reading the entire outer table by table joining threads or table joining processes of the inner table node comprises:
   gathering all portions of the outer table in a data set, each portion sent by an outer table node; and
   reading, by each of the table joining threads or the table joining processes, data row by row or in batches from the data set until the data set is completely read.

10. The inner table node according to claim 7, wherein the portion of the inner table from the inner table node includes a primary key index or a local index; and
    the matching, by the table joining thread or the table joining process, the outer table with the portion of the inner table stored at the inner table node comprises:
    searching, according to the primary key index or the local index in the table joining threads or the table joining processes, data of the inner table to match with data of the outer table.

11. The inner table node according to claim 7, wherein the table joining threads include a Nested Loop Join algorithm.

12. The inner table node according to claim 7, wherein the portion of the outer table is sent to the inner table node by broadcasting.

13. One or more non-transitory computer-readable storage media configured with instructions executable by one or more processors of an inner table node that stores a portion of an inner table less than the entire inner table to cause the one or more processors to perform operations comprising:
    obtaining an entire outer table by obtaining a portion of the outer table from each of outer table nodes through a computer network that couples the inner table node to each of the outer table node, wherein a size of the entire outer table is less than a size of the entire inner table, and the portion of the inner table is not transmitted from the inner table node to the outer table nodes;
    reading the entire outer table by table joining threads or table joining processes of the inner table node;
    matching, by the table joining threads or the table joining processes, the outer table with the portion of the inner table stored at the inner table node; and
    outputting data from the outer table and the portion of the inner table that matches with each other.

14. The one or more non-transitory computer-readable storage media according to claim 13, wherein the reading the entire outer table by table joining threads or table joining processes of the inner table node comprises:
    dividing the outer table into a plurality of pieces of data in a random or Round-Robin manner; and
    reading, by each of the table joining threads or the table joining processes, each of the plurality of pieces of data in sequence.

15. The one or more non-transitory computer-readable storage media according to claim 13, wherein the reading the entire outer table by table joining threads or table joining processes of the inner table node comprises:
- gathering all portions of the outer table in a data set, each portion sent by an outer table node; and
- reading, by each of the table joining threads or the table joining processes, data row by row or in batches from the data set until the data set is completely read.

16. The one or more non-transitory computer-readable storage media according to claim 13, wherein the portion of the inner table stored at the inner table node includes a primary key index or a local index; and
- the matching, by the table joining thread or the table joining process, the outer table with the portion of the inner table stored at the inner table node comprises:
- searching, according to the primary key index or the local index in the table joining threads or the table joining processes, data of the inner table to match with data of the outer table.

17. The one or more non-transitory computer-readable storage media according to claim 13, wherein the table joining threads include a Nested Loop Join algorithm.

* * * * *